US010613003B2

(12) United States Patent
Luharuka et al.

(10) Patent No.: US 10,613,003 B2
(45) Date of Patent: Apr. 7, 2020

(54) METHOD FOR DETERMINING A HEALTH CONDITION OF WELLSITE EQUIPMENT

(75) Inventors: Rajesh Luharuka, Katy, TX (US); Jijo Joseph, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 400 days.

(21) Appl. No.: 14/125,987

(22) PCT Filed: Jul. 9, 2012

(86) PCT No.: PCT/US2012/045983
§ 371 (c)(1),
(2), (4) Date: Feb. 18, 2014

(87) PCT Pub. No.: WO2013/009715
PCT Pub. Date: Jan. 17, 2013

(65) Prior Publication Data
US 2014/0229120 A1    Aug. 14, 2014

Related U.S. Application Data

(60) Provisional application No. 61/505,607, filed on Jul. 8, 2011.

(51) Int. Cl.
*E21B 47/06* (2012.01)
*G01M 99/00* (2011.01)
(Continued)

(52) U.S. Cl.
CPC ........... *G01M 99/002* (2013.01); *E21B 12/02* (2013.01); *E21B 43/26* (2013.01);
(Continued)

(58) Field of Classification Search
CPC .... E21B 47/1005; E21B 47/06; E21B 47/065; G01M 99/002; G01M 99/00; G01J 2005/0077; G01J 2005/0081
(Continued)

(56) References Cited

U.S. PATENT DOCUMENTS 7,845,413 B2 * 12/2010 Shampine ............. E21B 43/267
166/369
2004/0223533 A1    11/2004 Dishaw et al.
(Continued)

FOREIGN PATENT DOCUMENTS

CN    101422825 A    5/2009
CN    201358774 Y    12/2009
(Continued)

OTHER PUBLICATIONS

"Teamwork, tools and techniques: How one plant brought thermography in house" article from www.fluke.com, dated Sep. 2005.*
(Continued)

*Primary Examiner* — Leslie J Evanisko
(74) *Attorney, Agent, or Firm* — Cathy Hewitt (57) ABSTRACT

A system and method for determining a health condition of wellsite equipment is presented herein. The method includes thermally analyzing at least a portion of one of the wellsite equipment units with a thermal imaging device capable of detecting infrared light to determine a temperature of the analyzed portion of the wellsite equipment unit. The temperature of the analyzed portion of the wellsite equipment unit may be used to indicate the health condition of the wellsite equipment unit.

20 Claims, 5 Drawing Sheets

(51) Int. Cl.
   *E21B 43/26* (2006.01)
   *E21B 12/02* (2006.01)
   *E21B 47/10* (2012.01)
   *G01J 5/02* (2006.01)
   *G01J 5/00* (2006.01)

(52) U.S. Cl.
   CPC ........ *E21B 47/1005* (2013.01); *G01J 5/0066* (2013.01); *G01J 5/025* (2013.01); *G01J 5/026* (2013.01); *G01J 5/0265* (2013.01); *G01J 2005/0077* (2013.01)

(58) Field of Classification Search
   USPC .............................................. 702/33, 35, 40
   See application file for complete search history.

(56) References Cited

U.S. PATENT DOCUMENTS

| | | | |
|---|---|---|---|
| 2005/0254548 A1* | 11/2005 | Appel | G01K 3/005 374/57 |
| 2008/0152508 A1 | 6/2008 | Meza et al. | |
| 2013/0176418 A1* | 7/2013 | Pandey | G01N 25/72 348/83 |

FOREIGN PATENT DOCUMENTS

| | | |
|---|---|---|
| CN | 201382817 Y | 1/2010 |
| CN | 201396144 Y | 2/2010 |
| CN | 201687513 U | 12/2010 |
| CN | 201712524 U | 1/2011 |
| CN | 101975066 A | 2/2011 |
| CN | 102102499 A | 6/2011 |
| RU | 2004122771 A | 1/2006 |
| RU | 2365751 C2 | 8/2009 |

OTHER PUBLICATIONS

"Ti30 Thermal Imager User's Manual" from www.fluke.com, dated Jan. 2005.*
First Office Action issued in CN201280033972.X dated Feb. 3, 2015, 20 pages.
International Search Report and Written Opinion issued in PCT/US2012/045983 dated Oct. 11, 2012; 6 pages.
Office Action issued in related RU Application No. 2014104371 dated Feb. 26, 2016, with English translation by agent (10 pages).
Office Action issued in Canadian patent application No. 2840874 dated May 3, 2018; 5 pages.

* cited by examiner

METHOD FOR DETERMINING A HEALTH CONDITION OF WELLSITE EQUIPMENT

BACKGROUND

The statements made herein merely provide information related to the present disclosure and may not constitute prior art, and may describe some embodiments illustrating the invention.

Embodiments disclosed herein generally relate to a system and method for determining the health condition of wellsite equipment. Embodiments disclosed herein also relate to systems or methods for determining degradation conditions of wellsite equipment or predicting residual life of wellsite equipment before, during, and after an oilfield operation. Embodiments disclosed herein also relate to systems or methods for validating or optimizing a particular design selection or design change of wellsite equipment. Examples of such oilfield operations include, but are not limited to, well stimulation, wireline logging, measurement-while-drilling, logging-while-drilling, directional drilling, well construction, and the like.

In some embodiments, the wellsite equipment being maintained includes positive displacement pumps, sometimes referred to as reciprocating pumps. Positive displacement pumps are generally used in oilfield operations to pump fluids into a wellbore and the surrounding reservoir.

A given reciprocating pump may comprise one or more pump chambers that each receive a reciprocating plunger. When multiple chambers are enclosed in a reciprocating pump, the reciprocating pump is also called a multiplex pump. In any event, in a typical reciprocating pump, as the plunger is moved in one direction by the rotating crankshaft, fluid is drawn into the pump chamber through a one-way suction valve. Upon reversal of the plunger motion, the suction valve is closed and the fluid is forced outwardly through a discharge valve. The continued reciprocation of the plunger continues the process of drawing fluid into the pump and discharging fluid from the pump. The discharged fluid can be routed through tubing to a desired location, such as into a wellbore.

Typically, multiplex pumps have two sections: (a) a power end, the motor assembly that drives the pump plungers (the driveline and transmission are parts of the power end); and (b) a fluid end, the pump container that holds and discharges pressurized fluid. In triplex pumps, the fluid end has three fluid cylinders. In quintuplex pumps, the fluid end has five fluid cylinders. A fluid end may comprise a single block having all cylinders bored therein, commonly referred to as a monoblock fluid end. Alternatively, each individual cylinder can be bored in a single block, and subsequently multiple blocks are connected together to form an assembled fluid end, commonly referred to as a split fluid end. Embodiments of the current disclosure can be applied to multiplex pumps with monoblock fluid ends, split fluid ends, or other variations thereof.

One particularly useful application of the multiplex pump is hydraulic fracturing, where a fluid is pumped down a wellbore at a flow rate and pressure sufficient to fracture a subterranean formation. After the fracture is created or, optionally, in conjunction with the creation of the fracture, proppants may be injected into the wellbore and into the fracture. The proppant is a particulate material added to the pumped fluid to produce a slurry, which is often very abrasive and/or corrosive. Pumping this slurry at the required flow rate and pressure is a severe pump duty. In fracturing operations each pump may be required to pump up to twenty barrels per minute at pressures up to 20,000 psi. The pumps for this application are quite large and are frequently moved to the oilfield on semi-trailer trucks or the like. Many times a single multiplex pump will occupy the entire truck trailer. These pumps are connected together at the well site to produce a pumping system which may include several multiplex pumps. A sufficient number of pumps are connected to a common line to produce the desired volume and pressure output. For example, some fracturing jobs may require up to 36 pumps.

Since fracturing operations are desirably conducted on a continuous basis, the disruption of a fracture treatment because of a failure of surface equipment is costly, time consuming, inefficient, and unproductive. Further, when such massive pumps are used, it is difficult in some instances to determine, in the event of a pump failure, which pump has failed. Because of the severe pump duty and the frequent failure rate of such pumps, it is normal to take thirty to one hundred percent excess pump capacity to each fracture site. The necessity for the excess pump capacity requires additional capital to acquire the additional multiplex pumps and considerable expense to maintain the additional pumps and to haul them to the site. Therefore, multiplex pumps and other surface equipment are frequently disassembled and inspected before and after each fracture treatment and, in some instances, routinely rebuilt before or after each fracture treatment in an attempt to avoid equipment failures during subsequent fracture treatments.

The importance of timely diagnosis of the relative health of the pumping equipment cannot be understated, particularly for high pressure equipment. Traditionally, field operators have relied on walking the location to listen, feel, and see failures and leaks. However, recent health and safety requirements prohibit the presence of any person in high pressure areas during operation; for example, the area near the multiplex pumps. Without visual inspection of the equipment, late detection of a particular failure may result in severe damage to personnel, equipment, unsuccessful jobs, and sometimes environmental detriments. As such, it would be desirable to have a system and method for improved inspection and detection of wellsite equipment health condition on a macro-scale.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to one aspect of the present disclosure, at least one embodiment relates to a method for determining a health condition of wellsite equipment. The method comprises rigging up a plurality of wellsite equipment units at or nearby a wellsite. The method also comprises thermally analyzing at least a portion of one of the wellsite equipment units with a thermal imaging device capable of detecting infrared light to determine a temperature of the analyzed portion of the wellsite equipment unit. The method also comprises using the temperature of the analyzed portion of the wellsite equipment unit to indicate the health condition of the wellsite equipment unit.

According to another aspect of the present disclosure, at least one embodiment relates to a system for determining a health condition of wellsite equipment. The system comprises a plurality of wellsite equipment units located at or nearby a wellsite. The system also comprises an oilfield camera having an infrared sensor positionable at or nearby the wellsite for thermally analyzing at least a portion of one of the wellsite equipment units to determine a temperature of the analyzed portion of the wellsite equipment unit. Moreover, the system also comprises an oilfield thermal imaging tool having a processing unit operatively connectable to the oilfield camera for generating the health condition of the wellsite equipment unit based on the temperature of the analyzed portion of the wellsite equipment unit output from the oilfield camera.

However, many modifications are possible without materially departing from the teachings of this disclosure. Accordingly, such modifications are intended to be included within the scope of this disclosure as defined in the claims.

BRIEF DESCRIPTION OF THE DRAWINGS

Embodiments of a system and method for determining the health condition of wellsite equipment are described with reference to the following figures. The same numbers are used throughout the figures to reference like features and components. Implementations of various technologies will hereafter be described with reference to the accompanying drawings. It should be understood, however, that the accompanying drawings illustrate the various implementations described herein and are not meant to limit the scope of various technologies described herein.

DETAILED DESCRIPTION

Specific embodiments of the present disclosure will now be described in detail with reference to the accompanying drawings. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. Further, in the following detailed description of embodiments of the present disclosure, numerous specific details are set forth in order to provide a more thorough understanding of the invention. However, it will be apparent to one of ordinary skill in the art that the embodiments disclosed herein may be practiced without these specific details. In other instances, well-known features have not been described in detail to avoid unnecessarily complicating the description.

It should also be noted that in the development of any such actual embodiment, numerous decisions specific to circumstance must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Furthermore, the description and examples are presented solely for the purpose of illustrating the different embodiments, and should not be construed as a limitation to the scope and applicability. While any composition or structure may be described herein as comprising certain materials, it should be understood that the composition could optionally comprise two or more different materials. In addition, the composition or structure can also comprise some components other than the ones already cited. Although some of the following discussion emphasizes fracturing, the compositions and methods may be used in any well treatment in which diversion is needed. Examples include fracturing, acidizing, water control, chemical treatments, and wellbore fluid isolation and containment. Embodiments will be described for hydrocarbon production wells, but it is to be understood that they may be used for wells for production of other fluids, such as water or carbon dioxide, or, for example, for injection or storage wells. It should also be understood that throughout this specification, when a range is described as being useful, or suitable, or the like, it is intended that any and every value within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

Figure 1:
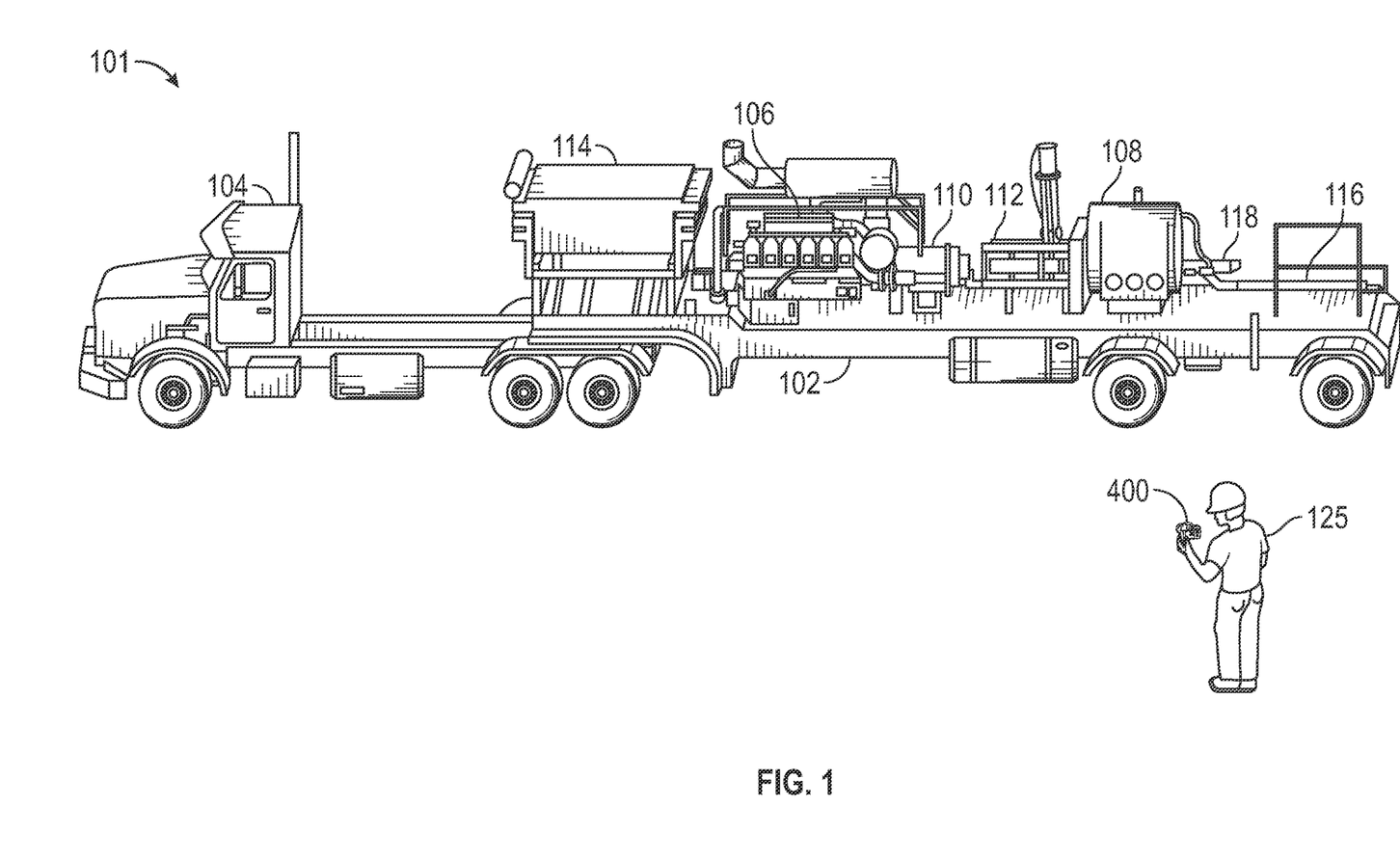
FIG. 1 illustrates a simplified, schematic view of wellsite equipment for performing an oilfield operation on a well in accordance with implementations of various technologies and techniques described herein.

Referring to the drawings, illustrations and pictures, and in particular FIG. 1, one example of a wellsite equipment unit is illustrated therein. A plunger pump 101 is depicted for pumping a fluid from a well surface to a wellbore. As shown, the plunger pump is mounted on a standard trailer 102 for ease of transportation by a tractor 104. The plunger pump 101 includes a prime mover 106 that drives a crankshaft through a transmission 110 and a driveshaft 112. The driveshaft 112, in turn, drives one or more plungers toward and away from a chamber in the pump 108 in order to create pressure oscillations of high and low pressures in the chamber. These pressure oscillations allow the pump 108 to receive a fluid at a low pressure and discharge it at a high pressure. Also connected to the prime mover 106 is a radiator 114 for cooling the prime mover 106. In addition, the pump 108 includes an intake pipe 116 for receiving fluid at a low pressure and a discharge pipe 118 for discharging fluid at a high pressure.

Because the wellsite equipment is subject to wear and tear, and general degradation due to extreme operating conditions, a field operator, equipment operator or field engineer 125 is depicted therein for inspecting the health condition of the wellsite equipment. As will be explained in more detail below, the engineer 125 may acquire and/or record data relating to the health condition of the wellsite equipment by capturing thermal images of the equipment with, for example, a thermal imaging device 400. As an alternative to being hand-held, the thermal imaging device 400 may be attached to the wellsite equipment being monitored, or to other fixtures at the wellsite.

Inspecting and/or monitoring a "health condition" of the wellsite equipment described herein may include, but should not be limited to: identifying failures and general wear and tear of particular components, such as bearings, lubrication systems, hydraulic systems, and cooling systems, as well as detecting leaks in valves, valve seats, packings, plungers, and treating iron, hosing, pipes, conduits and connections. Health condition inspection/monitoring in accordance with at least one embodiment presented herein may allow an equipment operator to predict failure of a particular wellsite equipment unit or component. The health condition inspection/monitoring may also include validation of a particular equipment design, and design selection based on anticipated operating conditions.

Figure 2:
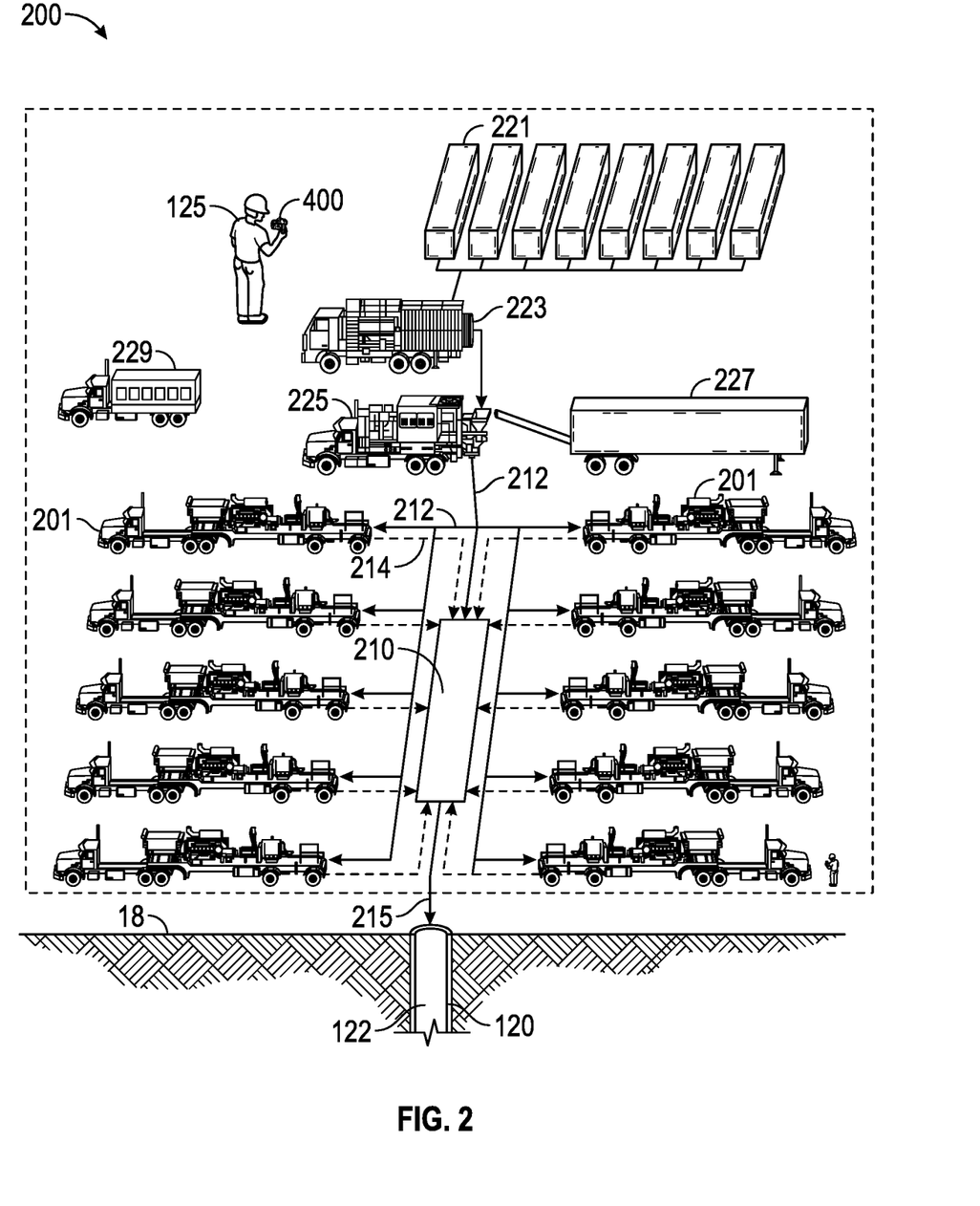
FIG. 2 illustrates a schematic view of an oilfield operation in accordance with implementations of various technologies and techniques described herein.

Referring now to FIG. 2, one example of a plurality of wellsite equipment units rigged up at or nearby a wellsite for performing an oilfield operation is shown with a field operator 125 depicted therein for inspecting the health condition of the wellsite equipment. A pumping system 200 is shown for pumping a fluid from a surface 18 of a well 120 to a wellbore 122 during an oilfield operation. In this particular example, the operation is a hydraulic fracturing operation, and hence the fluid pumped is a fracturing fluid. As shown, the pump system 200 includes a plurality of water tanks 221, which feed water to a gel maker 223. The gel maker 223 combines water from the tanks 221 with a gelling agent to form a gel. The gel is then sent to a blender 225 where it is mixed with a proppant from a proppant feeder 227 to form a fracturing fluid. The gelling agent increases the viscosity of the fracturing fluid and allows the proppant to be suspended in the fracturing fluid. It may also act as a friction reducing agent to allow higher pump rates with less frictional pressure.

The fracturing fluid is then pumped at low pressure (for example, around 60 to 120 psi) from the blender 225 to a plurality of plunger pumps 201 as shown by solid lines 212. Note that each plunger pump 201 in the embodiment of FIG. 2 may have the same or a similar configuration as the plunger pump 101 shown in FIG. 1. As shown in FIG. 2, each plunger pump 201 receives the fracturing fluid at a low pressure and discharges it to a common manifold 210 (sometimes called a missile trailer or missile) at a high pressure as shown by dashed lines 214. The missile 210 then directs the fracturing fluid from the plunger pumps 201 to the wellbore 122 as shown by solid line 215.

In a typical hydraulic fracturing operation, an estimate of the well pressure and the fracturing fluid flow rate required to create the desired side fractures in the wellbore is calculated. Based on this calculation, the amount of hydraulic horsepower needed from the pumping system in order to carry out the fracturing operation is determined. For example, if it is estimated that the well pressure and the required flow rate are 6000 psi (pounds per square inch) and 68 BPM (Barrels Per Minute), then the pump system 200 would need to supply 10,000 hydraulic horsepower to the fracturing fluid (i.e., 6000*68/40.8).

In one embodiment, the prime mover 106 in each plunger pump 201 is an engine with a maximum rating of 2250 brake horsepower, which, when accounting for losses (typically about 3% for plunger pumps in hydraulic fracturing operations), allows each plunger pump 201 to supply a maximum of about 2182 hydraulic horsepower to the fracturing fluid. Therefore, in order to supply 10,000 hydraulic horsepower to a fracturing fluid, the pump system 200 of FIG. 2 would require at least five plunger pumps 201.

However, in order to prevent an overload of the transmission 110, between the engine 106 and the fluid end 108 of each plunger pump 201, each plunger pump 201 is normally operated well under its maximum operating capacity. Operating the pumps under their operating capacity also allows for one pump to fail and the remaining pumps to be run at a higher speed in order to make up for the absence of the failed pump.

As such in the example of a fracturing operation requiring 10,000 hydraulic horsepower, bringing ten plunger pumps 201 to the wellsite enables each pump engine 106 to be operated at about 1030 brake horsepower (about half of its maximum) in order to supply 1000 hydraulic horsepower individually and 10,000 hydraulic horsepower collectively to the fracturing fluid. On the other hand, if only nine pumps 201 are brought to the wellsite, or if one of the pumps fails, then each of the nine pump engines 106 would be operated at about 1145 brake horsepower in order to supply the required 10,000 hydraulic horsepower to the fracturing fluid. As shown, a computerized control system 229 may be employed to direct the entire pump system 200 for the duration of the fracturing operation.

In performing the example operation as described above at the required fracturing fluid delivery pressure ("pressure"), fracturing fluid delivery flow rate ("flow rate"), and hydraulic horsepower, numerous opportunities for equipment failure are present. Often, equipment failure results in a significant amount of heat generation. For example, a priming loss on the fluid end of the positive displacement pump 108 results in an increased temperature of the fluid end. Other examples of a relation between an increased temperature and potential failure may include, but should not be limited to: a restriction in the lubrication system flowing to the bearings; increased frictional forces; degraded seals of the plunger, cross-head, and the like; or the presence of impurities in the lubricant. Early diagnosis of these failures would lead to prevention of significant damage to equipment and other undesirable events, such as environmental spillage.

Figure 3A:
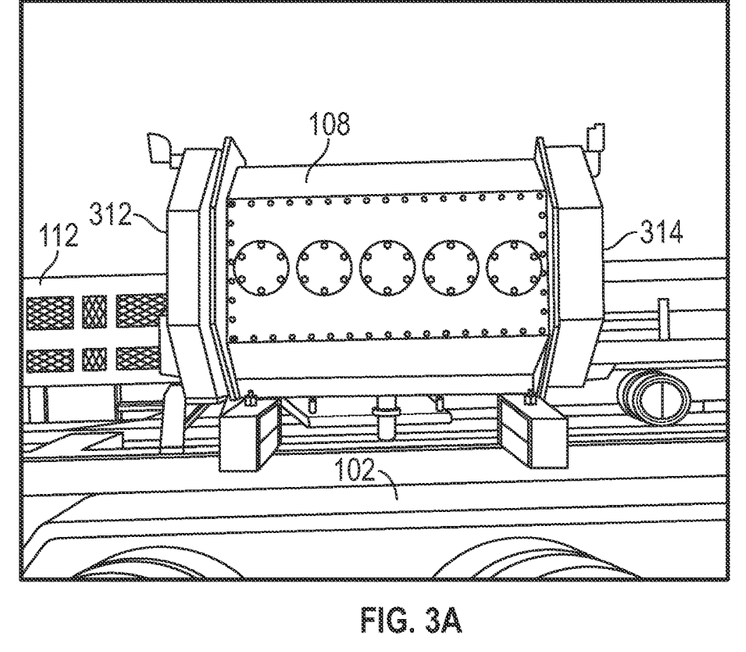
FIGS. 3A and 3B illustrate a captured image of a positive displacement pump power end in accordance with implementations of various technologies and techniques described herein.
Figure 3B:
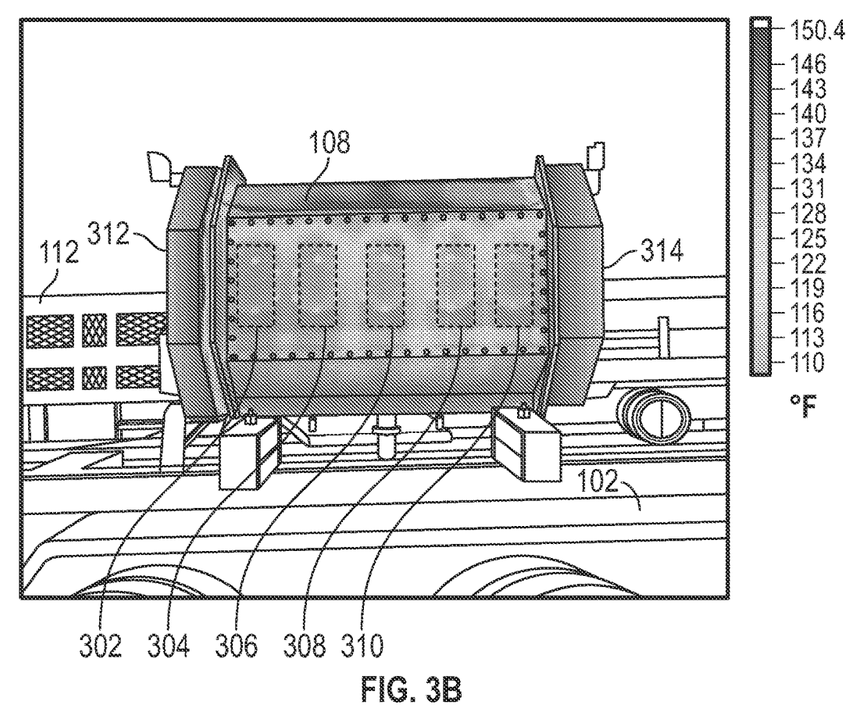

In an effort to identify and/or predict an equipment failure, thermal analysis may be performed on at least a portion of the wellsite equipment unit with a thermal imaging device in accordance with various embodiments disclosed herein. FIG. 3A depicts a schematic of one example of a wellsite equipment unit where failure may occur. In the depicted example, the wellsite equipment unit shown is a positive displacement pump 108, and more particularly, the power end side of a quintuplex pump 108. The pump 108 is depicted in FIGS. 3A and 3B as being mounted to a trailer 102 and connected to a drive shaft 112. The pump 108 has a first side 312 and a second side 314 defining a housing of the pump 108.

FIG. 3B depicts a captured thermal image of a portion of the positive displacement pump 108 shown in FIG. 3A taken with a thermal imaging device 400 during, or after, operation of the unit at a given pressure and flow rate. Shown more particularly in FIG. 3B, the thermal image of the pump 108 identifies the location of journal bearings 302, 304, 306, 308, and 310 within the housing of the pump 108. As noted herein, and discussed with reference to at least one other example hereinafter, thermal analysis of a wellsite equipment unit to inspect a health condition of said unit should not be limited to the positive displacement pump 108 shown in FIGS. 3A and 3B. Examples of wellsite equipment units which may be thermally analyzed may include: the trailer 102, prime mover 106, fluid end of the positive displacement pump 108, transmission 110, drive shaft 112, radiator 114, treating iron 116, 118, as well as, components of the gel maker 223, blender 225, proppant feeder 227 and the missile 210.

The thermal imaging device, or oilfield camera, 400 may be a thermal infrared camera comprising an infrared sensor capable of detecting infrared light. The thermal imaging device 400 may be handheld as shown in FIGS. 1 and 2, or may be operatively connected to fixtures at the wellsite. The thermal imaging device 400 is capable of generating thermal images of the subject captured by the infrared sensor. The camera 400 may be connected to an oilfield thermal imaging tool, which may be located in the control unit 229, to process the thermal image and generate the health condition of the analyzed well equipment unit. Examples of the thermal imaging device, or oilfield camera, 400 may include the FLIR GF300/320 or the Fluke Ti40FT IR Flex Cam, having a detectable temperature range of −2° C. to 350° C. Other thermal imaging devices known in the art may be used with a broader or narrower temperature range suitable for the particular application, or perhaps with a better detector resolution and accuracy than those described here. One advantage which may be desirable in an oilfield application is a robust thermal imaging device capable of withstanding the harsh conditions present at a wellsite. Another advantage which may be desirable is a thermal imaging device capable of capturing thermal images at a long distance, allowing inspection of wellsite equipment without close presence to high pressure areas. Yet another advantage which may be desirable is a thermal imaging device capable of overlapping emitted infrared radiation over reflected visible light. In other words, it may be desirable for the infrared image to be overlapped with the digital image of the captured subject, thereby creating a datum point for measurement. Such overlapping may also allow the operator 125 to distinguish between reflected and emitted temperature reading.

In the example thermal image shown in FIG. 3B, identification of the health condition of the positive displacement pump 108 may be based on comparing the temperature of the analyzed portion of the pump 108 with a theoretical reference temperature calculated as a function of the an operating parameter, such as flow rate and pressure. For example, the theoretical reference temperature may be calculated using the equations:

$$\text{Temp}_{theor} = a_1*(V_1)^{b1} + a_2*(V_2)^{b2} + \ldots + a_n*(V_n)^{bn} \quad (1)$$

or $$\text{Temp}_{theor} = a_1*(V_1)^{b1} + a_2*(V_2)^{b2} + a_3*(V_3)^{b3} + \ldots + a_n*(V_n)^{bn} \quad (2)$$

where $a_1, a_2 \ldots a_n$ and $b_1, b_2 \ldots b_n$ are constants (including zero), and $V_1$ is the flow rate, $V_2$ is the pressure, $V_3$ is the RPM, and $V_n$ is a placeholder for other variables, such as hydraulic horsepower.

Applying one of the above equations, a field operator 125 may determine if a wellsite equipment unit is in a healthy condition, or an unhealthy condition where maintenance is, or will be, required. For example, in the thermal image shown in FIG. 3B, the analyzed portion of the positive displacement pump 108 may be selected as one of the known bearing locations 302, 304, 306, 308 or 310. Specifically analyzing the known bearing location 302, the thermal image may indicate that said portion of the pump 108 has a local maximum temperature of 142° F. At a given operating condition, preferably proximate the time that the thermal image was captured with the thermal imaging device 400, the operating flow rate and pressure of the pump 108 may yield a theoretical reference temperature of, for example, 99° F. In such example, the theoretical reference temperature (99° F.) represents an approximate 30% difference from the local maximum temperature (142° F.). Depending on a set of predetermined criteria for the specific wellsite equipment unit, such difference may indicate that the pump 108 is operating at too high of a temperature for the given flow rate and pressure, and thus is approaching failure and/or further analysis is required. For example, the analyzed bearing 302 may be experiencing too much friction as a result of a failing lubrication system, worn out seals, or the presence of impurities in the lubricant.

Likewise, identification of the health condition of the positive displacement pump 108 may be based on comparing one known bearing location with another known bearing location within the same thermal image. For example, using the thermal image captured with the thermal imaging device, the field operator 125 may compare a local maximum temperature of the bearing location 302 with a local maximum temperature of the bearing location 304. It should be noted that while the examples discussed herein reference "local maximum temperature," it is also possible to use a local mean temperature either determined by analysis over a defined period of time or analysis within a defined set of coordinates. In the current example, the health condition of the pump 108 may be identified as 'healthy' if the difference between the temperature values of the bearing locations 302 and 304 are within a predetermined range of safety. On the contrary, the health condition of the pump 108 may be identified as 'unhealthy' if the difference between the temperature values of the bearing locations 302 and 304 are outside of the predetermined range of safety. Depending on the accuracy level desired, said predetermined range of safety may be a difference of 0.1° F., 1° F., 10° F., 20° F., or 100° F.

In another example of using a thermal image to identify the health condition of the positive displacement pump 108, a ratio of the temperature values of the bearing locations 302 and 304 ($T_{302}/T_{304}$) for an analyzed operating condition may be compared with a ratio of temperature values of the bearing locations 302 and 304 ($T_{302}/T_{304}$) for a reference operating condition using Equation (1) or (2) above. In addition, a ratio of the temperature values of the bearing locations 302 and 304 ($T_{302}/T_{304}$) for an analyzed operating condition may be compared with a reference limiting value based on test data. For example, if the ratio $T_{302}/T_{304}$ is above a tested limiting value of 1.06 or lower than 0.93, then power end of the pump 108 may require further analysis or maintenance. Moreover, a ratio of the temperature values of the bearing locations 302 and 304 ($T_{302}/T_{304}$) may be compared with a ratio of the temperature values of the bearing locations 306 and 308 ($T_{306}/T_{308}$), bearing locations 304 and 306 ($T_{304}/T_{306}$), or any known bearing location ($T_m/T_n$) either within the same thermal image or using more than one thermal image.

In yet another example of using a thermal image to identify the health condition of the positive displacement pump 108, a ratio of the temperature values of one of the sides of the pump 108 (e.g., first side 312) and a known bearing location (e.g., 302) ($T_{312}/T_{302}$) for an analyzed operating condition may be compared with a ratio of temperature values ($T_{312}/T_{302}$) for a reference operating condition using Equation (1) or (2) above. In addition, a ratio of the temperature values of one of the sides of the pump 108 (e.g., first side 312) and a known bearing location (e.g., 302) ($T_{312}/T_{302}$) may be compared with a reference limiting value based on test data. For example, if the ratio $T_{312}/T_{302}$ is above a tested limiting value of 1.25 or lower than 1.0, then power end of the pump 108 may require further analysis or maintenance. Moreover, a ratio of the temperature values of the first side 312 of the pump 108 and a known bearing location 302 ($T_{312}/T_{302}$) may be compared with a ratio of the temperature values of the first side 312 of the pump 108 and a known bearing location 304 ($T_{312}/T_{304}$), or a ratio of any identifiable reference point of the pump 108 and any bearing location ($T_s/T_m$). Although bearing locations 302, 304, 306, 308 or 310 are referenced herein with the positive displacement pump 108 as examples of an analyzed portion of a wellsite equipment unit, it should be noted that various locations on various equipment units may be used to determine the health condition of the analyzed wellsite equipment unit.

Figure 4A:
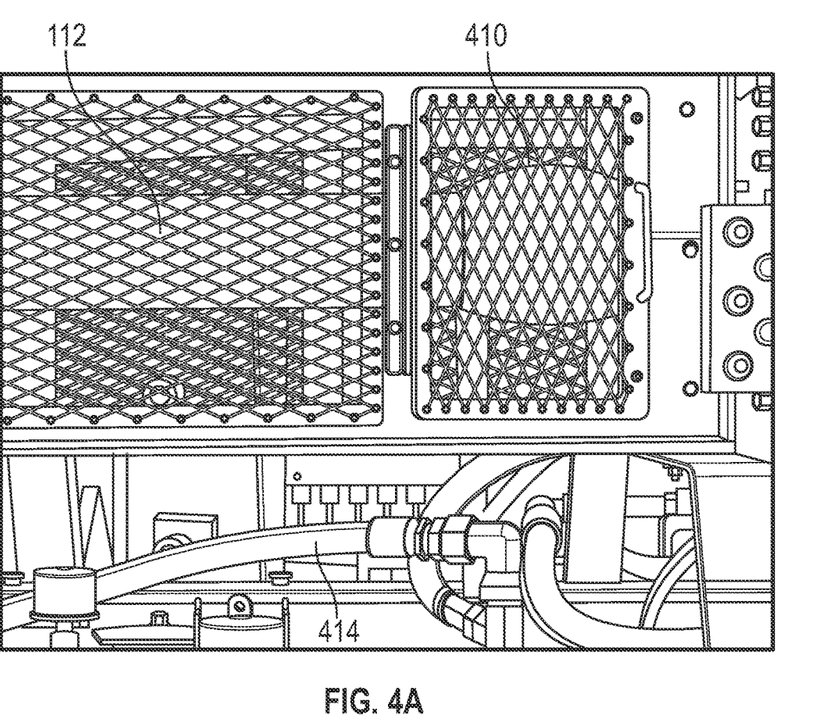
FIGS. 4A and 4B illustrate a captured image of a drive shaft in accordance with implementations of various technologies and techniques described herein.
Figure 4B:
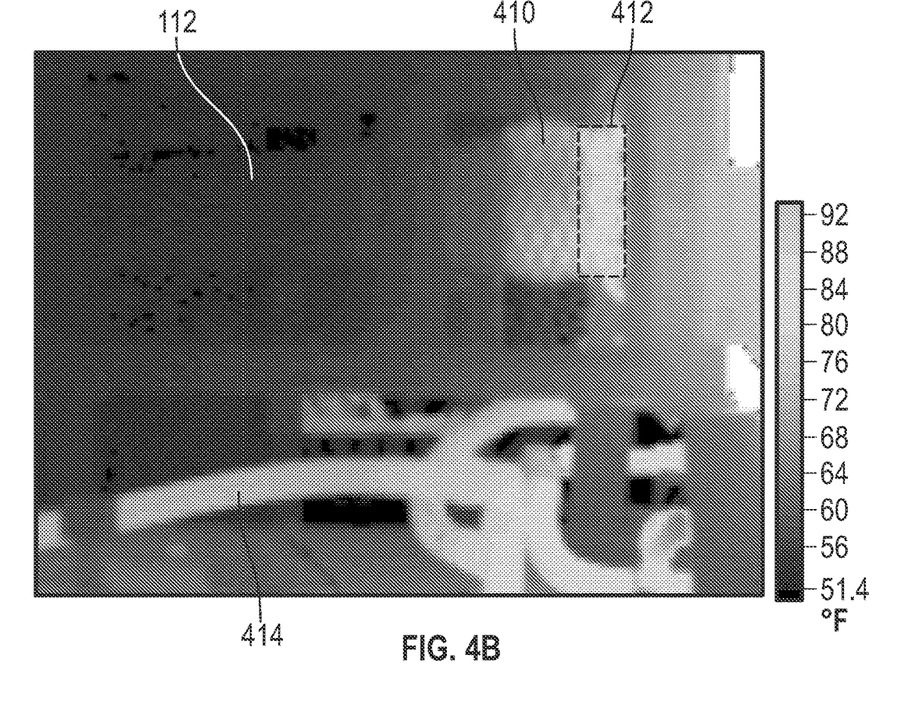

Another example of using thermal analysis to identify and/or predict an equipment failure is shown in FIGS. 4A and 4B. FIG. 4A depicts the drive shaft 112 and FIG. 4B depicts a thermal image of the drive shaft 112 in operation. The drive shaft 112 comprises a U-joint 410 allowing the drive shaft 112 to compensate for vertical and horizontal misalignment, and hosing 414 for fluid delivery. The U-joint 410 should be lubricated, or greased, on a regular basis for continual, smooth operation. If the U-joint is insufficiently lubricated, increased friction in the drive shaft 112 will result in an increased temperature.

In the thermal image shown in FIG. 4B, an analyzed portion 412 is identified as being a relatively high temperature. The health condition of the drive shaft 112 may be determined by comparing the temperature of the analyzed portion 412 with a reference limiting value based on test data for said analyzed portion 412. Likewise, the health condition of the drive shaft 112 may be determined by comparing a ratio the temperature of the analyzed portion 412 and another location of the wellsite equipment unit with a theoretical reference temperature calculated using an operating parameter, such as RPM, flow rate or pressure. If the comparison of values yields a difference that is greater than an acceptable range, then the drive shaft 112 may require maintenance (e.g., additional grease) or further analysis and inspection.

Determining a temperature, or thermal value, of the analyzed portion of the positive displacement pump 108 with the thermal image may be performed using a variety of techniques, whether such temperature is the local maximum temperature, local mean temperature, or random temperature value. The temperature may be identified by a group of pixels on the thermal image that correspond to a particular thermal value interpreted by the infrared sensor of the thermal imaging device 400. In comparing temperatures between thermal images, a thermal value may be selected by a user or by a processing unit, and may be selected based on a single pixel or a group of pixels in the thermal image corresponding to a temperature of the selected portion of the wellsite equipment unit.

Figure 5:
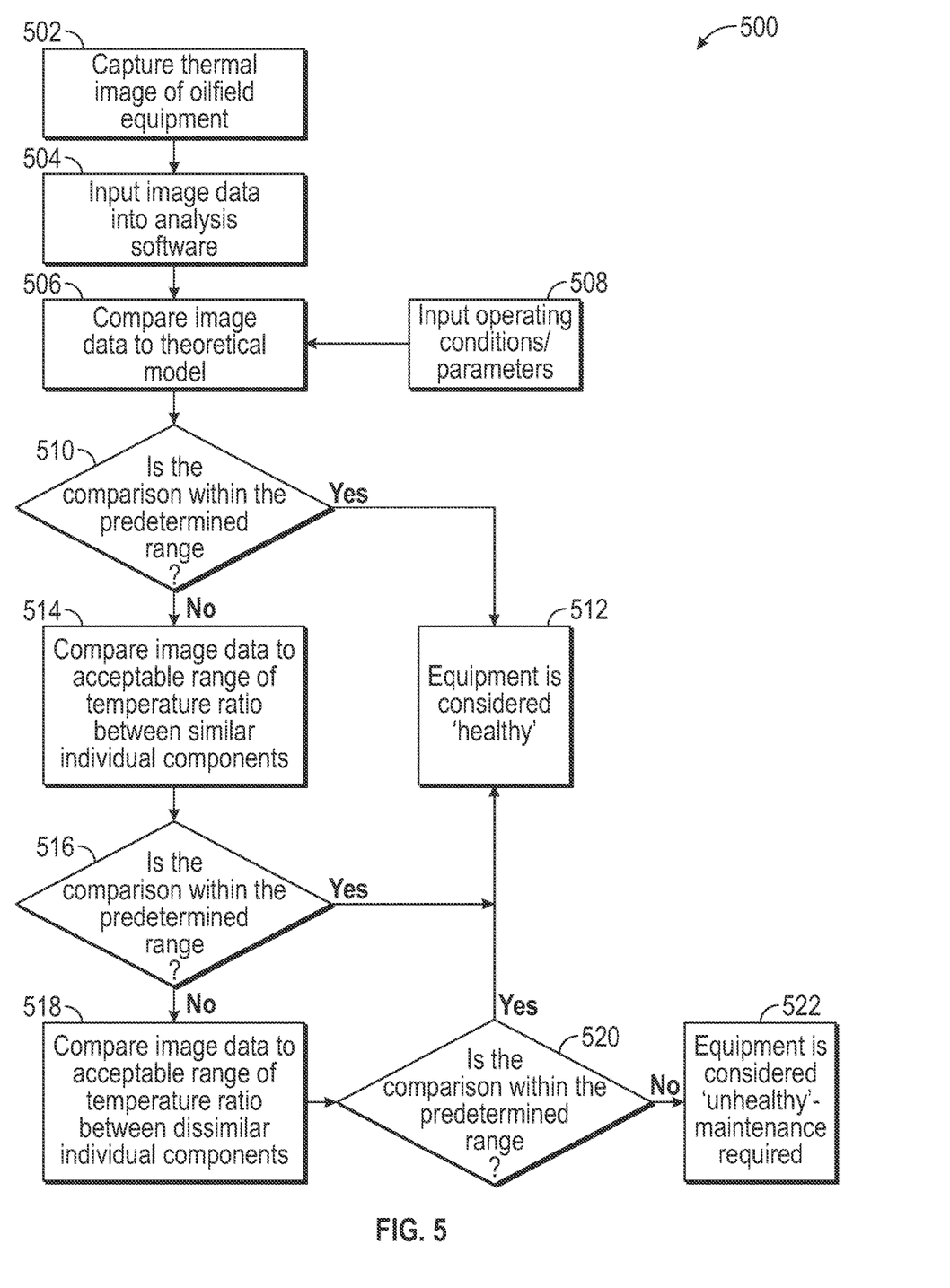
FIG. 5 depicts a schematic flow diagram illustrating health monitoring of an oilfield operation in accordance with implementations of various technologies and techniques described herein.

FIG. 5 depicts a schematic flow diagram 500 illustrating health monitoring of an oilfield operation. Although steps of the method for determining a health condition of wellsite equipment are discussed herein, it should be noted that the steps are not necessarily mutually exclusive and should not be interpreted to imply a particular order. In step 502, an image of the wellsite equipment unit is captured using the thermal imaging device 400. In step 504, the image may be input into analysis software where a diagnosis of the image may be performed to determine a temperature profile of the equipment unit being analyzed. In step 506, temperature values identified in the image may be compared to a theoretical reference model. Operating conditions/parameters, such as flow rate, pressure, RPM, hydraulic horsepower and the like, may be input 508 into the theoretical reference model to determine a theoretical reference temperature. In step 510, the comparison of the temperature identified in the thermal image with the theoretical reference temperature may indicate the health condition of the wellsite equipment unit. If the comparison, e.g. ratio of temperature values, is within a predetermined range, then the equipment may be considered healthy (step 512). However, if the comparison is not within the predetermined range, then the equipment may either require maintenance or further analysis.

Additional analysis may include, as indicated in step 514, using the thermal image data to compare the temperature ratio of similar components of the wellsite equipment unit to a tested range of values. If, in step 516, the comparison is within a predetermined range of acceptable values, then the equipment may be considered healthy (step 512). However, if the comparison is not within the predetermined range, then the equipment may either require maintenance or further analysis.

Examples of additional analysis may include, as indicated in step 518, using the thermal image data to compare the temperature ratio of dissimilar components of the wellsite equipment unit to a tested range of values. If, in step 520, the comparison is within a predetermined range of acceptable values, then the equipment may be considered healthy (step 512). However, if the comparison is not within the predetermined range, then the equipment may either require maintenance or further analysis (step 522).

The preceding description has been presented with reference to some embodiments. Persons skilled in the art and technology to which this disclosure pertains will appreciate that alterations and changes in the described structures and methods of operation can be practiced without meaningfully departing from the principle, and scope of this application. Moreover, while the system and method presented herein were described with specific reference to a fracturing operation, it will be appreciated that the wellsite equipment monitoring system and method may likewise apply to cementing, acidizing, logging or drilling operations. Accordingly, the foregoing description should not be read as pertaining only to the precise structures described and shown in the accompanying drawings, but rather should be read as consistent with and as support for the following claims, which are to have their fullest and fairest scope.

What is claimed is:

1. A method for determining a health condition of wellsite equipment, comprising:

operating a plurality of wellsite equipment units at or nearby a wellsite;

thermally analyzing at least a portion of at least one wellsite equipment unit of the plurality of wellsite equipment units with a thermal imaging device capable of detecting infrared light to determine a temperature of the analyzed at least a portion of the at least one wellsite equipment unit;

calculating a theoretical reference temperature of the analyzed at least a portion of the at least one wellsite equipment unit utilizing a theoretical reference model, wherein the theoretical reference model is based on one or more operating parameters of the at least one wellsite equipment unit;

determining a health condition of the at least one wellsite equipment unit with an oilfield thermal imaging tool comprising a processing unit using the determined temperature and the theoretical reference temperature of the analyzed at least a portion of the at least one wellsite equipment unit; and if the determined health condition is an unhealthy condition, prompting a user to perform maintenance on the at least one wellsite equipment unit, wherein prompting the user is determined by the determined health condition.

2. The method of claim 1, wherein the thermal imaging device is a thermal infrared camera.

3. The method of claim 1, wherein operating comprises operating the at least one wellsite equipment unit at a predetermined flow rate and pressure.

4. The method of claim 3, wherein determining comprises comparing the temperature of the analyzed at least a portion of the at least one wellsite equipment unit with the theoretical reference temperature and wherein calculating comprises calculating the theoretical reference temperature as a function of the predetermined flow rate and pressure.

5. The method of claim 4, further comprising comparing the temperature of the analyzed at least a portion of the at least one wellsite equipment unit with a reference temperature of the analyzed at least a portion of the at least one wellsite equipment unit determined by the thermal imaging device during normal operation of the at least one wellsite equipment unit.

6. The method of claim 5, wherein the temperature of the analyzed at least a portion of the at least one wellsite equipment unit comprises identifying a group of pixels on a thermal image that correspond to a thermal value.

7. The method of claim 4, wherein determining comprises further comparing the temperature of the analyzed at least a portion of the at least one wellsite equipment unit with another theoretical reference temperature calculated as a function of the predetermined flow rate and pressure.

8. The method of claim 1, wherein the health condition of the at least one wellsite equipment unit is indicated by comparing a thermal value associated with at least one pixel on a thermal image that corresponds to the analyzed at least a portion of the at least one wellsite equipment unit against other pixels on the thermal image.

9. The method of claim 1, wherein the health condition of the at least one wellsite equipment unit is indicated by comparing a thermal value associated with at least one pixel on a thermal image that corresponds to the analyzed at least a portion of the at least one wellsite equipment unit against at least one other pixel on another thermal image that corresponds to the analyzed at least a portion of the at least one wellsite equipment unit.

10. The method of claim 1, wherein the at least one wellsite equipment unit is a positive displacement pump comprising a power end and a fluid end, the power end having a first side and second side, and comprising at least two bearings.

11. The method of claim 10, wherein the health condition of the at least one wellsite equipment unit is indicated by comparing a ratio of a first temperature and a second temperature to a theoretical reference ratio.

12. The method of claim 11, wherein the first temperature is selected from a thermal image as a maximum localized thermal value at or near a first known bearing location and wherein the second temperature is selected from the thermal image as a maximum localized thermal value at or near a second known bearing location.

13. The method of claim 11, wherein the first temperature is selected from a thermal image as a localized mean thermal value at or near a first known bearing location and wherein the second temperature is selected from the thermal image as a localized mean thermal value at or near a second known bearing location.

14. The method of claim 1, wherein the health condition of the at least one wellsite equipment unit is indicated by comparing a ratio of a first temperature and a second temperature of the analyzed at least a portion of the at least one wellsite equipment unit with a limiting value based on test data.

15. The method of claim 1, wherein determining a health condition of the at least one wellsite equipment unit comprises identifying a failure of a particular component of the at least one wellsite equipment unit.

16. The method of claim 1, wherein determining a health condition of the at least one wellsite equipment unit comprises predicting a failure of a particular component of the at least one wellsite equipment unit.

17. The method of claim 1, wherein determining a health condition of the at least one wellsite equipment unit comprises validating a design of a particular component of the at least one wellsite equipment unit.

18. The method of claim 1, wherein a type of the prompted maintenance to be performed comprises at least one of a further analysis and an inspection.

19. The method of claim 1, wherein the maintenance to be performed comprises at least applying additional grease to a portion of the at least one wellsite equipment unit.

20. The method of claim 1, wherein the one or more operating parameters comprise flow rate through the at least one wellsite equipment unit, a pressure of the at least one wellsite equipment unit, an operating speed of the at least one wellsite equipment unit, or some combination thereof.

* * * * *